United States Patent
Bohori et al.

(10) Patent No.: US 8,618,435 B2
(45) Date of Patent: Dec. 31, 2013

(54) ABLATIVE PLASMA GUN

(75) Inventors: Adnan Kutubuddin Bohori, Bangalore (IN); Thangavelu Asokan, Bangalore (IN)

(73) Assignee: General Electric Company, Niskayuna, NY (US)

( * ) Notice: Subject to any disclaimer, the term of this patent is extended or adjusted under 35 U.S.C. 154(b) by 1254 days.

(21) Appl. No.: 12/471,662

(22) Filed: May 26, 2009

(65) Prior Publication Data
US 2010/0301021 A1   Dec. 2, 2010

(51) Int. Cl.
*B23K 10/00* (2006.01)
*H05H 1/34* (2006.01)

(52) U.S. Cl.
USPC ........... 219/121.48; 219/121.54; 219/121.52; 219/121.36

(58) Field of Classification Search
CPC ................................. B23K 10/00; H05H 1/34
USPC .............. 219/121.36, 121.5, 121.48, 121.59, 219/121.52, 74, 75
See application file for complete search history.

(56) References Cited

U.S. PATENT DOCUMENTS

| | | | |
|---|---|---|---|
| 4,531,075 A | | 7/1985 | Stone |
| 4,570,106 A | * | 2/1986 | Sohval et al. ............. 315/111.81 |
| 4,780,591 A | | 10/1988 | Bernecki et al. |
| 4,924,059 A | | 5/1990 | Rotolico et al. |
| 5,465,030 A | * | 11/1995 | Smith ........................ 315/349 |
| 5,655,210 A | * | 8/1997 | Gregoire et al. .............. 422/186 |
| 5,680,014 A | * | 10/1997 | Miyamoto et al. ........ 315/111.41 |
| 5,945,790 A | * | 8/1999 | Schaefer ....................... 315/335 |
| 6,300,720 B1 | * | 10/2001 | Birx ......................... 315/111.21 |
| 7,605,008 B2 | * | 10/2009 | Chua et al. ......................... 438/7 |
| 8,175,209 B2 | * | 5/2012 | Auchterlonie ................. 376/141 |
| 8,328,982 B1 | * | 12/2012 | Babayan et al. ......... 156/345.43 |
| 2005/0062430 A1 | * | 3/2005 | Schroder et al. ......... 315/111.21 |
| 2008/0239598 A1 | | 10/2008 | Asokan et al. |
| 2008/0253040 A1 | | 10/2008 | Asokan et al. |
| 2009/0134129 A1 | * | 5/2009 | Robarge et al. .......... 219/121.48 |

OTHER PUBLICATIONS

L. Montgomery Smith, Dennis R. Keefer; Novel Designs for the Decade Coaxial Plasma Gun; IEEE Transactions on Plasma Science, vol. 30, No. 5, Oct. 2002.

* cited by examiner

*Primary Examiner* — Mark Paschall
(74) *Attorney, Agent, or Firm* — Jason K. Klindtworth (57) ABSTRACT

An ablative plasma gun is presented. The ablative plasma gun includes a first gun electrode and a second gun electrode arranged between a dielectric layer to form a longitudinal slot. An opening at a distal end of the longitudinal slot is provided to spread generated plasma.

7 Claims, 8 Drawing Sheets

ABLATIVE PLASMA GUN

BACKGROUND

The present invention generally relates to plasma guns, particularly to ablative plasma guns.

Electric power circuits and switchgear have conductors separated by insulation. Air space often serves as part or all of this insulation in some areas. If the conductors are too close to each other or voltage exceeds the insulation properties, an arc can occur between conductors. Air or any insulation (gas or solid dielectrics) between conductors can become ionized, making the insulation conductive thereby enabling arcing. Arc temperature can reach as high as 20,000° C., vaporizing conductors and adjacent materials, and releasing an explosive energy that destroys circuits.

Arc flash is the result of a rapid energy release due to an arcing fault between phase-phase, phase-neutral, or phase-ground. An arc flash can produce high heat, intense light, pressure waves, and sound/shock waves similar to that of an explosion. However, the arc fault current is usually much less in magnitude as compared to short circuit current, and hence delayed or no tripping of circuit breakers is expected unless the breakers are selected to handle an arc fault condition. Typically, arc flash mitigation techniques use standard fuses and circuit breakers. However, such techniques have slow response times and are not fast enough to mitigate an arc flash.

One other technique to mitigate arc fault is to employ a shorting (mechanical crowbar) switch, placed between the power bus and ground, or between phases. The crowbar switch shorts the line voltage on the power bus and diverts the energy away from the arc flash thus protecting equipment damage due to arc blasts. The resulting short on the power bus causes an upstream circuit breaker to clear the bolted fault. Such switches, which are large and costly, are located on the main power bus that shuts down the entire power system when a fault occurs even if the fault is only on the load side of a branch circuit. As a result, the mechanical crowbars are known to cause extreme stress on upstream transformers due to bolted fault condition.

There is a need for improved arc flash prevention mechanism that has an improved response time and that is cost effective.

BRIEF DESCRIPTION

Briefly, an ablative plasma gun is presented. The ablative plasma gun includes a first gun electrode and a second gun electrode arranged between a dielectric layer to form a longitudinal slot. An opening at a distal end of the longitudinal slot is provided to spread generated plasma.

In one embodiment, an ablative plasma gun is presented. The ablative plasma gun includes a first gun electrode and a second gun electrode defining a longitudinal slot. At least one dielectric layer having the longitudinal slot is disposed between the first and the second gun electrode. An opening at distal end of the longitudinal slot is provided to spread plasma across a wide longitudinal distance.

In one embodiment, an arc elimination system is presented. The arc elimination system includes an arc mitigating device comprising at least two electrodes forming a gap and coupled to a phase or neutral or ground in an electrical power system. An ablative plasma gun having a first gun electrode and a second gun electrode is arranged between a dielectric layer to form a longitudinal slot. An opening is provided at a distal end of the longitudinal slot to spread a generated plasma. A trigger circuit is provided to generate an electrical pulse for the ablative plasma gun, wherein the ablative plasma gun is arranged between the gap and the generated plasma lowers an electrical impedance in the gap between the at least two electrodes.

In another embodiment, an arc mitigating device is presented. The arc mitigating device includes at least two main electrodes separated by a gap and coupled to electrically different portions of an electrical power system. The device includes at least two ablative plasma guns having a longitudinal slot to spread a generated plasma in wide longitudinal distance. The ablative plasma guns are disposed proximate to the gap and main electrodes and configured to bridge the gap between said main electrodes by plasma spread upon receipt of a trigger signal. The trigger signal is generated when an arc fault is detected.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
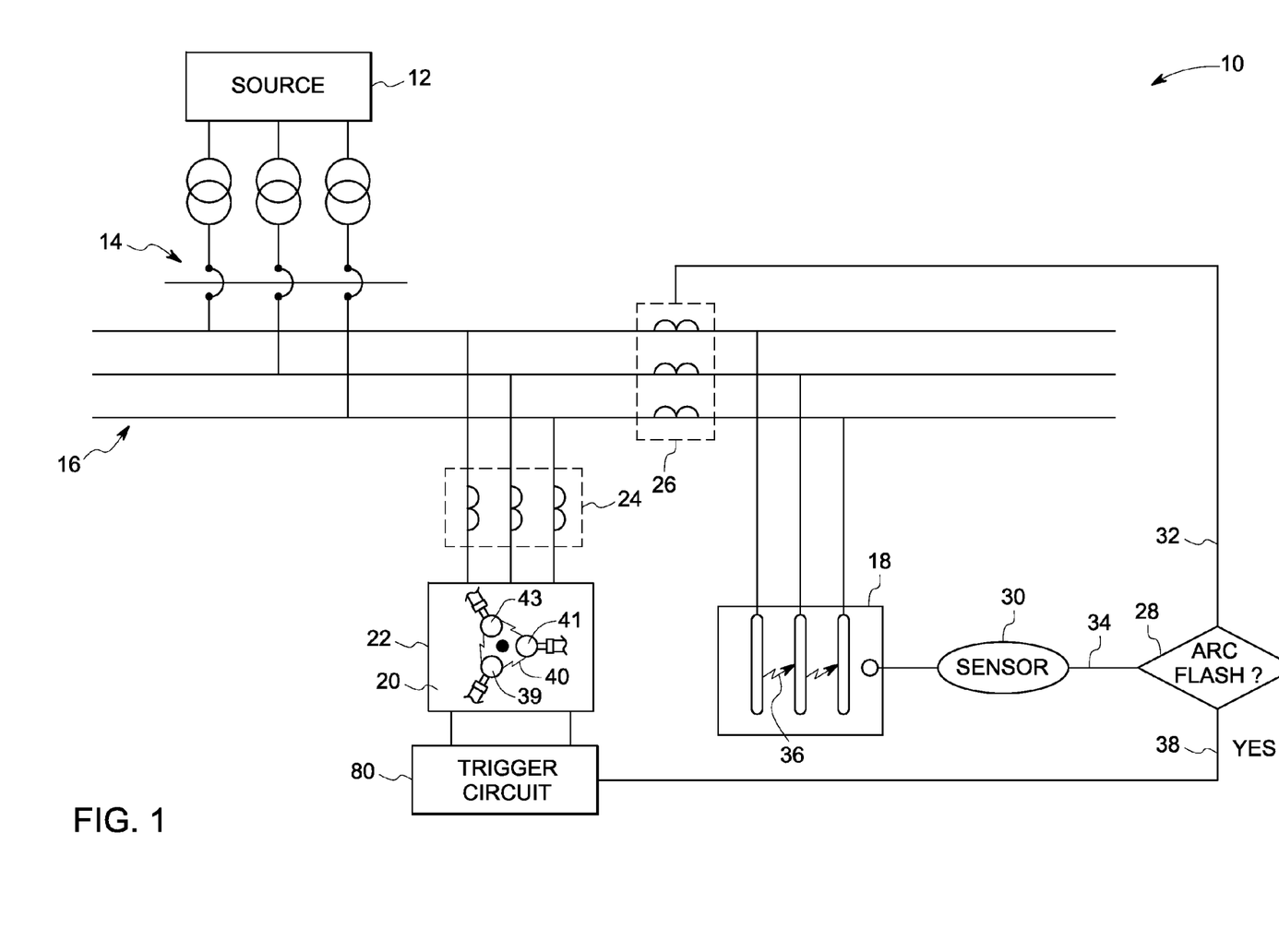
FIG. 1 is a schematic of an electrical power system implementing an ablative plasma gun according to an aspect of the invention.

Referring to FIG. 1, an electrical power system is illustrated and designated generally by the reference numeral 10. In the illustrated embodiment, the electrical power system 10 includes a power source 12 configured to deliver power to a load 18 via a circuit breaker 14. In an exemplary embodiment, the power source 12 is configured to deliver alternating current or AC power to a common bus 16. The electrical power system 10 illustrated herein includes an exemplary three-phase configuration. In another embodiment, the electrical power system 10 may include a single phase configuration. The power source 12 and the load 18 are further coupled via common bus 16 to arc mitigating device 20. The arc mitigating device 20 is enclosed within an arc containment device 22.

An arc flash detection system is configured to detect an arc flash event 36 within the electrical power system 10. The arc flash detection system includes an electrical signal monitoring system 26, an arc flash decision system 28 and a sensor 30. The electrical signal monitoring system 26 is configured to monitor current variations in the electrical power system that may arise due to an arc flash event. In one example, the electrical signal monitoring system 26 includes a current transformer. Furthermore, the arc flash decision system 28 is configured to receive electrical parameters 32 from the electrical signal monitoring system 26 and parameters 34 from the sensor 30. As used herein, the term 'parameters' refers to parameters such as, for example, optical light, thermal radiation, acoustic, pressure, or radio frequency signal originating from an arc flash 36. Accordingly, in such an embodiment, the sensor includes an optical sensor. Based on the parameters 32 and 34, the arc flash decision system 28 generates an arc fault signal 38 in an event of the arc flash event 36. The arc fault signal 38 further triggers the trigger circuit 80 coupled to the arc mitigating device 20. Non-limiting examples of the arc mitigating device 20 includes an arc absorber, a high power switch and a mechanical crowbar. A second electrical signal monitoring system 24 may be coupled between the arc mitigating device 20 and the common bus 16. As will be appreciated by those skilled in the art, the arc mitigating device 20 helps mitigate effects of the arc flash event by creating deliberate short that results in tripping an upstream circuit breaker.

One method of mitigating arc flash 36 is by creating an arcing fault across the electrodes of the arc mitigating device 20 coupled to the common bus 16. As used herein, the term arcing fault means short the electrodes coupled to the electrical circuit deliberately by way of plasma spray. Such arcing fault activates a protective device upstream (such as circuit breaker 14) thereby cutting power supplied to the faulty power system. The arc mitigating device 20 is configured to create a protective arc 40 in case of arc fault 36. An ablative plasma gun 42 generates plasma that is used to short the electrodes in the arc mitigating device 20. Accordingly, such deliberate fault may be carried out within a safe containment wherein the energy is diverted away from the fault location. The protective arc 40 emits a substantial amount of energy in the form of intense light, sound, pressure waves and shock waves. It further causes vaporization of electrodes resulting in high pressure. It may be noted that the arc mitigating device 20, by virtue of its functionality, includes an enclosure or arc containment device 22 robust enough to contain shock waves and high pressure resulting from protective arc 40. The construction and functionality of the arc containment device 22 is discussed in detail at FIG. 7.

The arc mitigating device 20 (or main arc device) comprises main electrodes 39, 41, 43 coupled to a phase or neutral or ground in the electrical power system 10. While this embodiment shows three main electrodes, other embodiments may include more or less number of electrodes as required by the electrical power system. A clearance between the main electrodes 39, 41, 43 is required for normal operation of the system and may depend on the system voltage. Table 1 summarizes electrode clearance, bias voltage and basic insulation level in low and medium voltage systems. For example, a low voltage system operating at about 600 volts may require a clearance of about 25 mm between the electrodes 39, 41, 43. However, a medium voltage system operating at about 15,000 volts may require an increased clearance of about 152 mm.

TABLE 1

Comparison of electrode clearance and bias voltage

|  | Low voltage system | Medium voltage system |
| --- | --- | --- |
| System Voltage (V) | 600 | 15,000 |
| Electrode clearance (mm) | 25 | 152 |
| Bias Voltage at arc flash (V) | ~200 | ~500 |
| Basic insulation level (kV) | 8 | 110 |

Ablative plasma gun implemented in low voltage arc mitigating device may not be effective in creating a bridge in a main gap (during a deliberate arc fault) between the electrodes 39, 41, 43 of the medium voltage system as the clearance is about 6 times the low voltage system. Furthermore the bias voltage is low (about 500V) to bridge a gap of about 152 mm in the medium voltage system. As used herein, in an exemplary embodiment, "bias voltage" is the voltage across the main electrodes during the arc flash condition. With an effective spread of about 25 mm that was achieved by ablative plasma gun in the low voltage system, six such plasma guns must be used in a medium voltage system to bridge the gap of about 152 mm. However, multiple arc guns in series may reduce the basic insulation level below the required standards for medium voltage system which is about 110 kV (see Table 1). Further, breakdown voltage to trigger the plasma gun increases with multiple plasma guns coupled in series thereby increasing the size and cost of the trigger circuit. Certain embodiments of the invention are designed to overcome such limitations of the ablative plasma gun by having an enhanced spread of plasma and a lower bias voltage requirement for efficient trigger mechanism.

Figure 2:
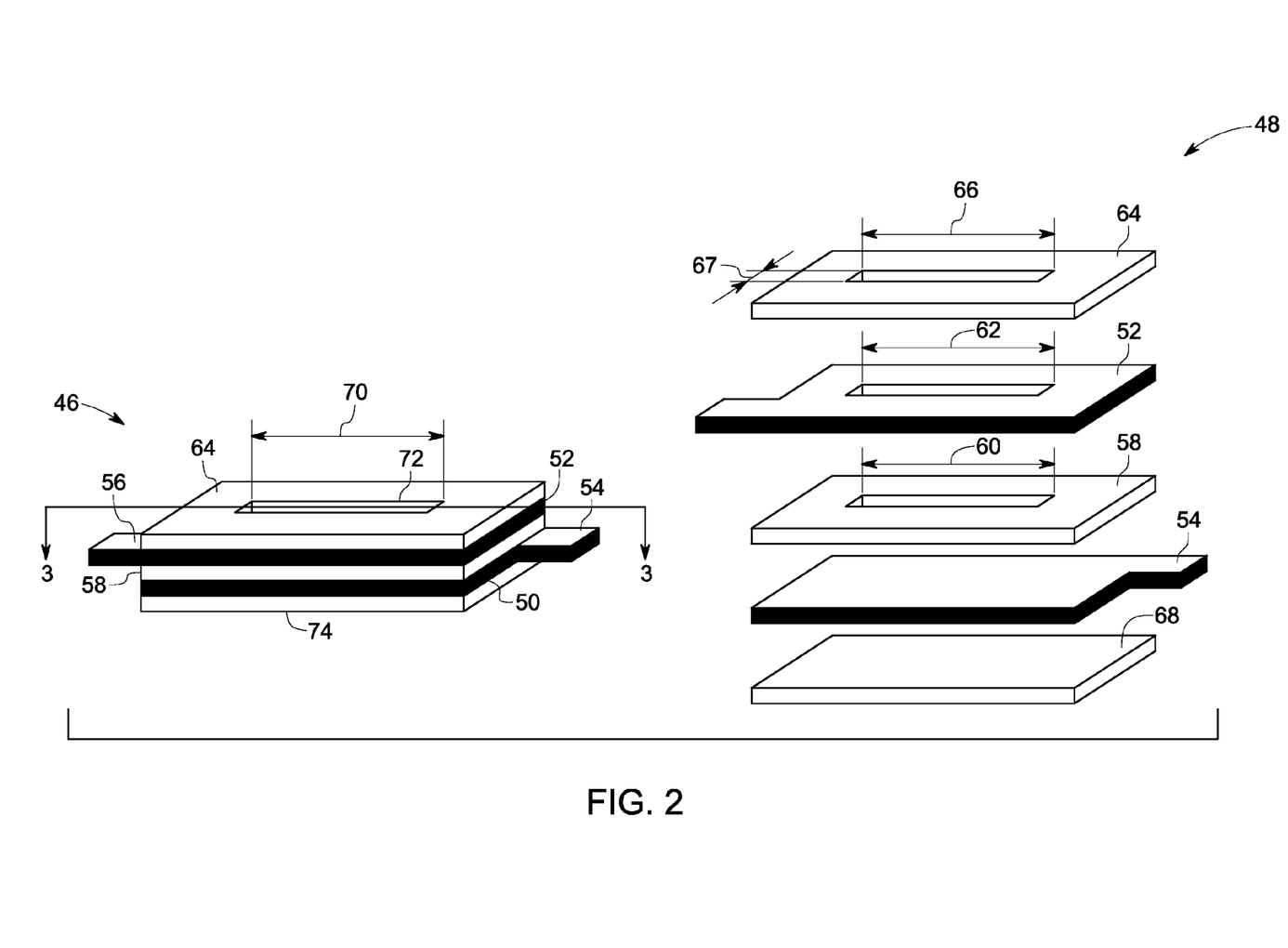
FIG. 2 illustrates an ablative plasma gun according to an embodiment of the invention.

Turning to FIG. 2, an ablative plasma gun according to an embodiment of the invention is illustrated by the reference numeral 46 and 48. In an assembled view 46 of the ablative plasma gun, a first gun electrode 50 and a second gun electrode 52 are arranged between a dielectric layer 58. The gun electrodes 50, 52 include respective notches 54 and 56, to facilitate connection to an external device such as a trigger circuit. An exploded view 48 of the ablative plasma gun illustrates the first gun electrode 50 disposed on a base dielectric layer 68. A slotted dielectric layer 58 defining a longitudinal slot 60 is disposed on the second gun electrode 52 having longitudinal slot 62. Further a second dielectric layer 64 is disposed on the second gun electrode 52 having a longitudinal slot 66 generally aligned with the slots 60 and 62. In the illustrated embodiment, when plasma gun 46 is assembled having the dielectric layers and the gun electrodes an opening 70 at a distal end 72 is formed. The longitudinal slot through the opening 70 is configured to spread generated plasma. A proximal end 74 having the base dielectric layer 68 forms the base of the plasma gun 46.

Figure 3:
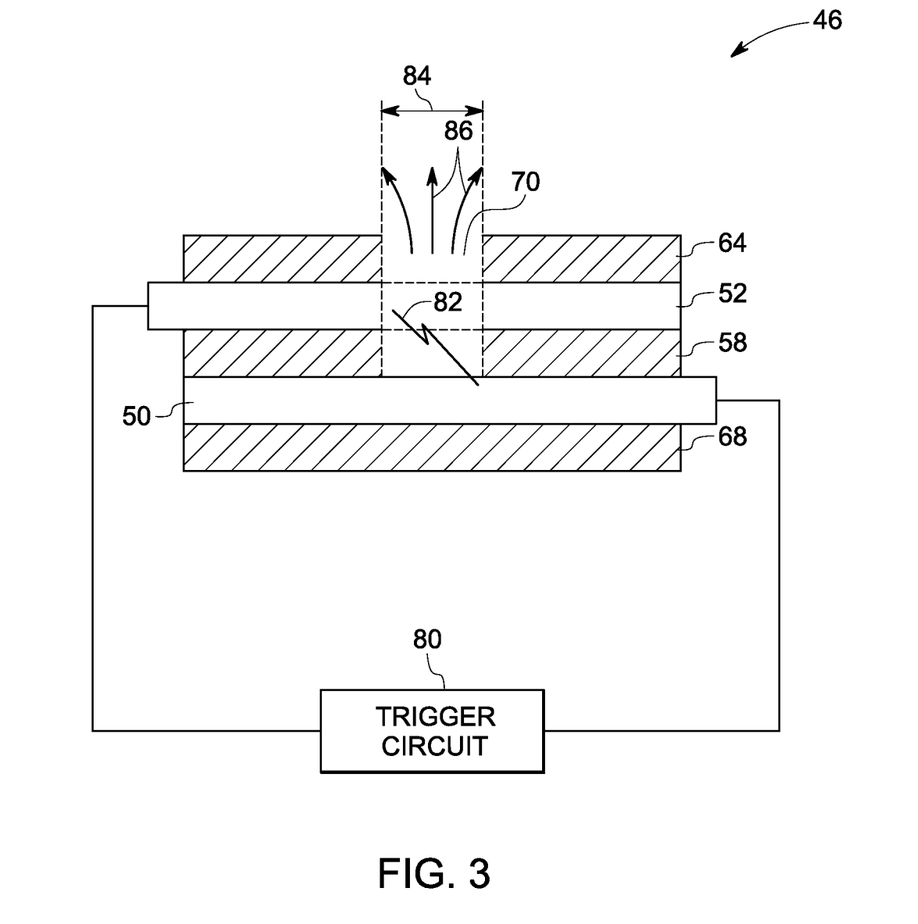
FIG. 3 illustrates a cross sectional view of the plasma gun of FIG. 2.

FIG. 3 illustrates a cross sectional view of the plasma gun of FIG. 2. During an operation, the plasma gun 46 is connected to a trigger circuit 80 configured to generate a pulse of high electric potential between the electrodes 50, 52 to create an arc 82 that ablates some of the material in the dielectric layer and gun electrodes to create a highly conductive plasma 86 at high pressure. The plasma exits the opening 70 spreading across a wide longitudinal distance. In an exemplary embodiment, a spread of about 70 mm is achieved.

Characteristics of the plasma jet 86 such as velocity, ion concentration, and spread, may be controlled by the electrode dimensions and separation, the dimensions of the longitudinal slot 84, the type of ablative material, and the trigger pulse shape and energy. The dielectric layer may be Polytetrafluoroethylene, Polyoxymethylene Polyamide, Poly-methyle methacralate (PMMA), other ablative polymers, or various mixtures of these materials. The longitudinal slot 84 may be generally elongated, to maximize the plasma spread, and minimize ejection time of the plasma.

Referring back to FIG. 2, the inventors have innovatively recognized that the ablative plasma gun 48 embodying the longitudinal slot may generally have a length (66) of about 20 mm to 30 mm and a width (67) of about 1 mm to 2 mm for effective plasma spread of about 50 mm to about 70 mm. Further, the electrode separation that is achieved by dielectric layer 58 may be about 0.8 mm in thickness. In one embodiment, the gun electrode (50, 52) is made from an electrically conductive material of about 1 mm thickness. Non-limiting examples of the gun electrode material include copper and stainless steel. As will be appreciated by those skilled in the art, achieving such plasma spread of about 70 mm is substantially greater than any known technique.

Figure 4:
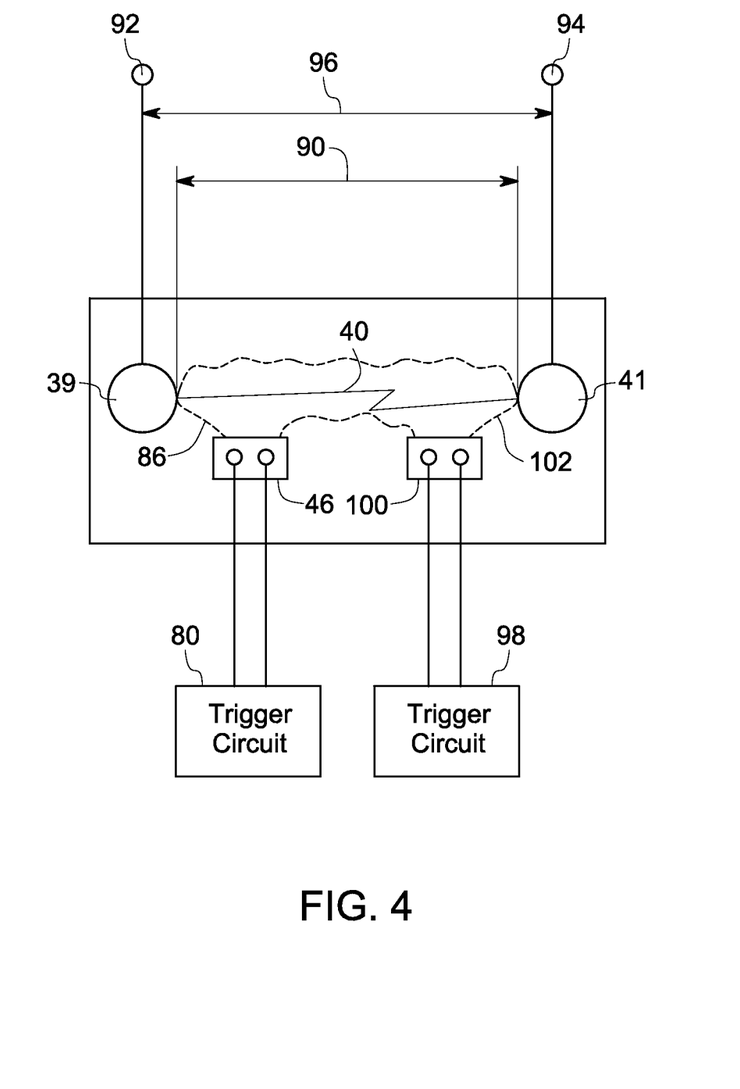
FIG. 4 illustrates a zoomed in view of the electrodes within the arc crowbar of FIG. 1.

FIG. 4 illustrates a zoomed in view of the electrodes within the arc mitigating device 20 referenced in FIG. 1. Generally, the arc crowbar has two or more main electrodes 39, 41 separated by a gap 90 of air or another gas. Each electrode 39, 41 is connected to an electrically different portion 92, 94 of a circuit, for example different phases, neutral, or ground. This provides a bias voltage 96 across the arc gap 90. Trigger circuits 80, 98 provide a trigger pulse to the ablative plasma guns 46, 100 causing the guns to eject ablative plasma 86, 102 into the gap 90, lowering the gap impedance and initiating an arc 40 between the electrodes 39, 41.

An arc flash 36 as referenced in FIG. 1 on the circuit 92, 94 may reduce the bias voltage 96 available across the gap 90. The impedance of the main electrode gap 90 may be designed for a given voltage by the size and spacing of the main electrodes 39, 41, so as not to allow arcing until triggering. Two plasma guns 46, 100 may be used in a medium voltage system to bridge a clearance in the range of about 100 mm to about 190 mm, or as discussed in the above example about 152 mm. Characteristics of the plasma 86, 102 may be determined by the spacing of the plasma gun 46, 100, the longitudinal slot dimensions (66 as referenced in FIG. 2), the trigger pulse shape and energy, and the placement of the plasma guns 46 and 100. Thus the impedance of the main gap 90 upon triggering can be designed to produce a relatively fast and robust protective arc 40.

Figure 5:
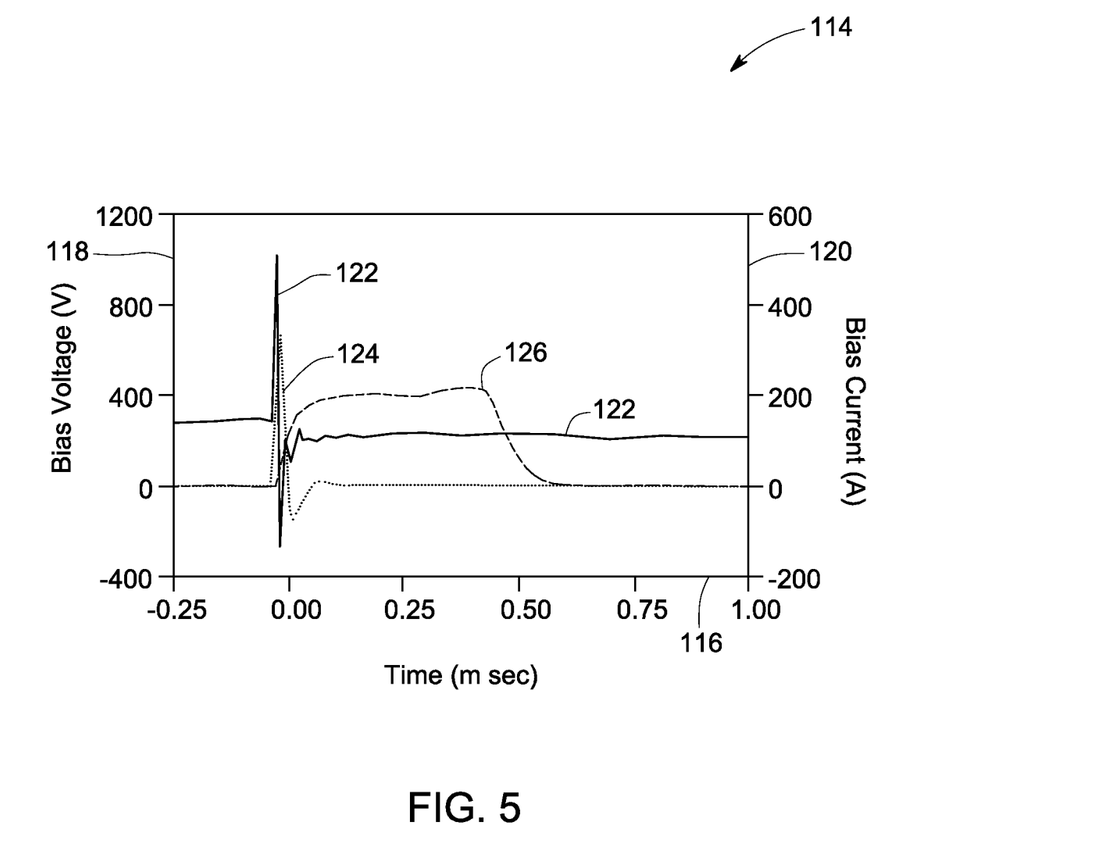
FIG. 5 is a graphical illustration of the trigger pulse, bias voltage and the bias current during an operation of the plasma gun.

FIG. 5 is a graphical illustration of the trigger pulse, bias voltage and the bias current during an operation of the plasma gun as described in FIG. 4. The illustrated embodiments in FIG. 5 are from an experimental setup. As used herein, the "experimental setup" includes two electrodes separated by a gap of about 152 mm and at least two plasma guns disposed in the gap and having a construction according to presently contemplated embodiments. The graph 114 includes time in milliseconds on the horizontal axis 116 and bias voltage expressed in volts and bias current expressed in amperes respectively on the vertical axis 118 and 120. As used herein, the voltage and current magnitude in the graph 114 are exemplary. However, the actual magnitude may vary for different systems. In the illustrated embodiments, profile 124 is the trigger pulse of about 10 kA peak is applied for about 20 microseconds between the gun electrodes by the trigger circuit. In response to the trigger pulse, the bias voltage (profile 122) from about 300 volts prior to trigger, may drop substantially immediately after the arc is formed, and settle at about 200 volts after the conduction is established between the electrodes. The bias current (profile 126) is zero before the trigger and reaches about 300 amps (for about 0.4 millisecond) before it dies down to zero after the fault in the external circuit is cleared. Waveforms such as voltages and currents, during an operation of the presently contemplated embodiments, coupled to an exemplary power system, are represented in FIG. 6.

Figure 6:
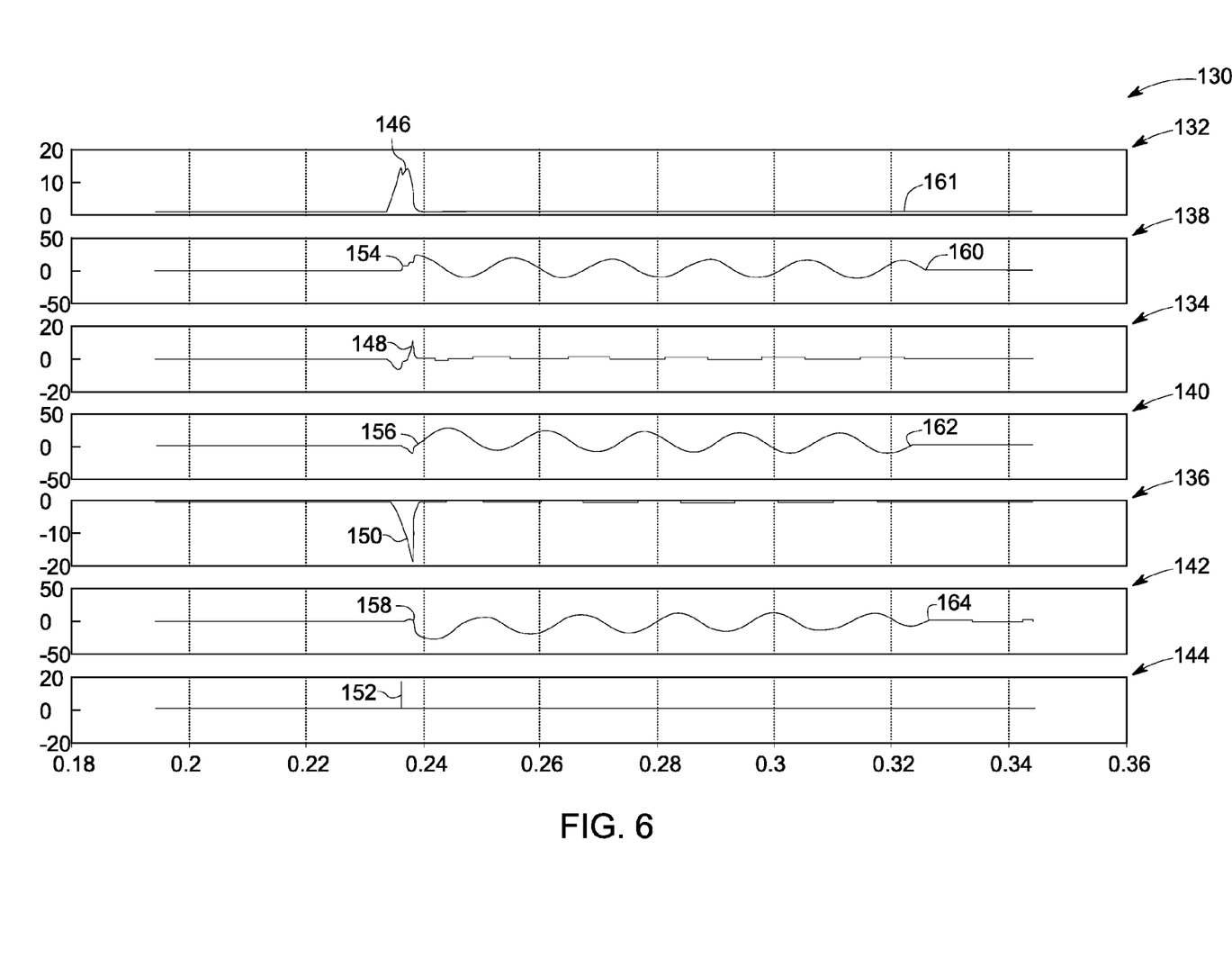
FIG. 6 is a graphical illustration of the trigger pulse, bias voltage and the bias current during an operation of the plasma gun coupled to an exemplary power system.

FIG. 6 is a graphical illustration of the trigger pulse, bias voltage and the bias current during an operation of the plasma gun coupled to an exemplary power system of FIG. 1. Multiple graphs illustrated by the numeral 130 include seconds on the horizontal axis and kilo-amps on the vertical axis. Phase currents (measured by the electrical signal monitoring system 26 in FIG. 1) due to an arc fault is illustrated by graphs 132, 134, 136 in the respective phases A, B and C. Further, the current flowing through the A, B and C phases of the arc mitigating device 20 (measured by the second electrical signal monitoring system 24 referenced in FIG. 1) is represented by graphs 138, 140, and 142 respectively. The trigger pulse generated by the trigger circuit 80 (see FIG. 1) is illustrated by the graph 144. At an instance of arc fault 36 (referenced in FIG. 1), the phase current, for example, in A phase starts to increase as illustrated by the numeral 146. Similarly, phase current in the other phases starts to increase (148, 150.) As the phase current due to arc fault increases, the trigger circuit generates a trigger pulse 152. In one embodiment, the trigger pulse includes peak amplitude of about 10 kilo-amps having time duration of about 20 microseconds. Such trigger pulse 152 initiates protective arc in the main gap within the arc mitigating device 20. The trigger pulse 152 initiates protective arc bridging the gap between the main electrodes. Current flows through the arc mitigating device (154, 156, 158) as a result of protective arc shorting the main electrodes. During such interval (between 154 and 160) when current is flowing through the arc mitigating device, the arc fault reduces to zero (see 161.) At the instance 160 (or 162, 164) the upstream circuit breaker (such as circuit breaker 14 illustrated in FIG. 1) trips and halts the power flow into the faulty power system, thus mitigating the arc fault.

Figure 7:
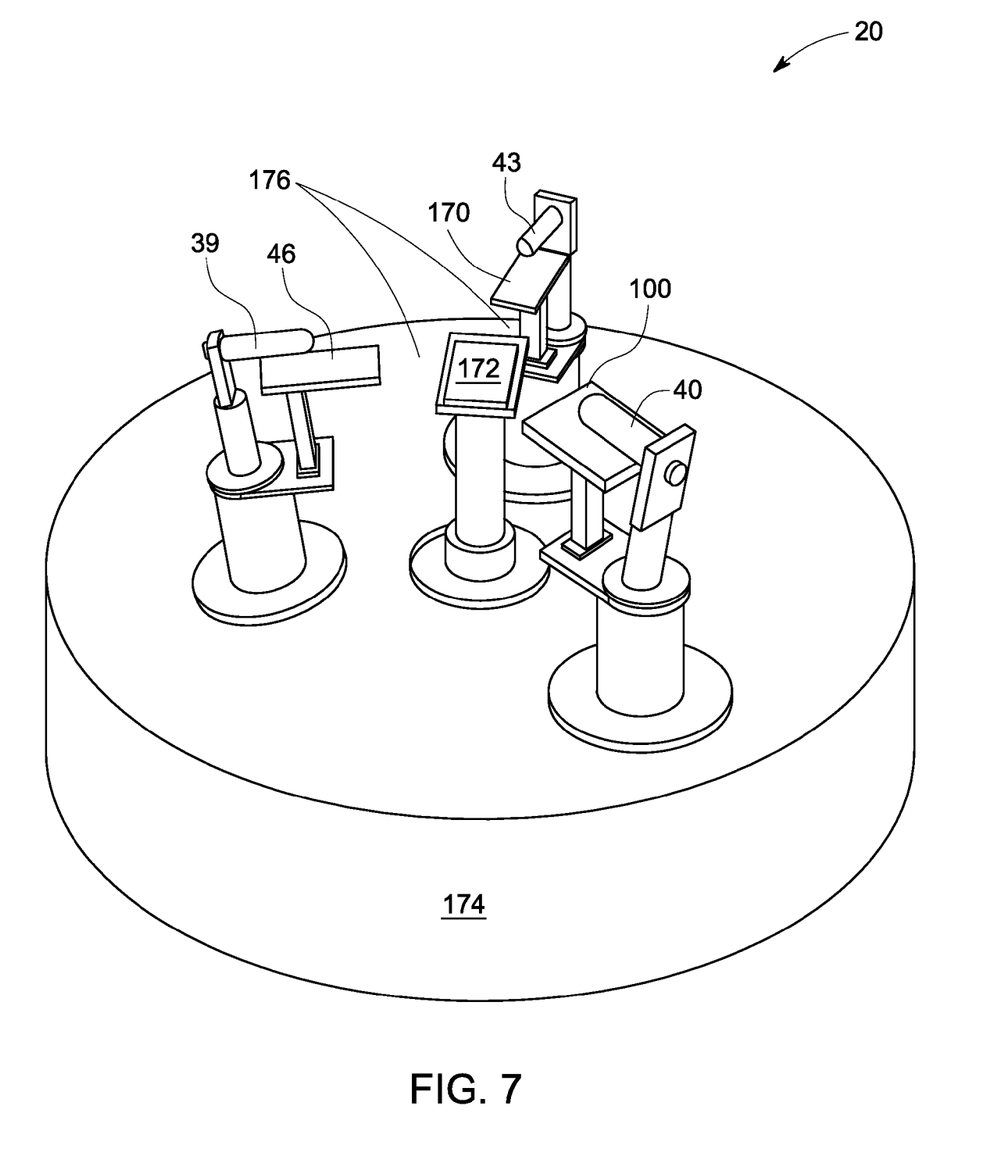
FIG. 7 is a perspective view of the arc crowbar system in FIG. 1.

FIG. 7 is a perspective view of the arc mitigating device in FIG. 1. The electrodes 39, 41 and 43 are each coupled to an electrically different portion (not shown) of a circuit, for example different phases, neutral, or ground from bottom of an insulation base 174. During an arc fault, a protective arc fault may be induced between the electrodes via ionized plasma generated from the ablative plasma guns. A trigger circuit coupled to the ablative plasma guns may produce an arc between the gun electrodes to generate the ionized plasma that bridge the main electrodes. As discussed above, medium voltage system may have larger clearance between the electrodes as compared to the low voltage systems. Presently contemplated embodiments of as described in FIGS. 2, 3, 4, having longitudinal slot ablative plasma guns with wide longitudinal spread of plasma may be implemented between the electrodes 39, 41, and 43 hosted on the insulation base 174. For enhanced trigger capabilities at least two guns may be used between an electrode pair. One such arrangement is illustrated in FIG. 7 having a central arc plasma gun 172 disposed adjacent to plasma guns 46, 100, 170 respectively placed in the gap 176 between the electrodes 39, 41 and 43.

Figure 8:
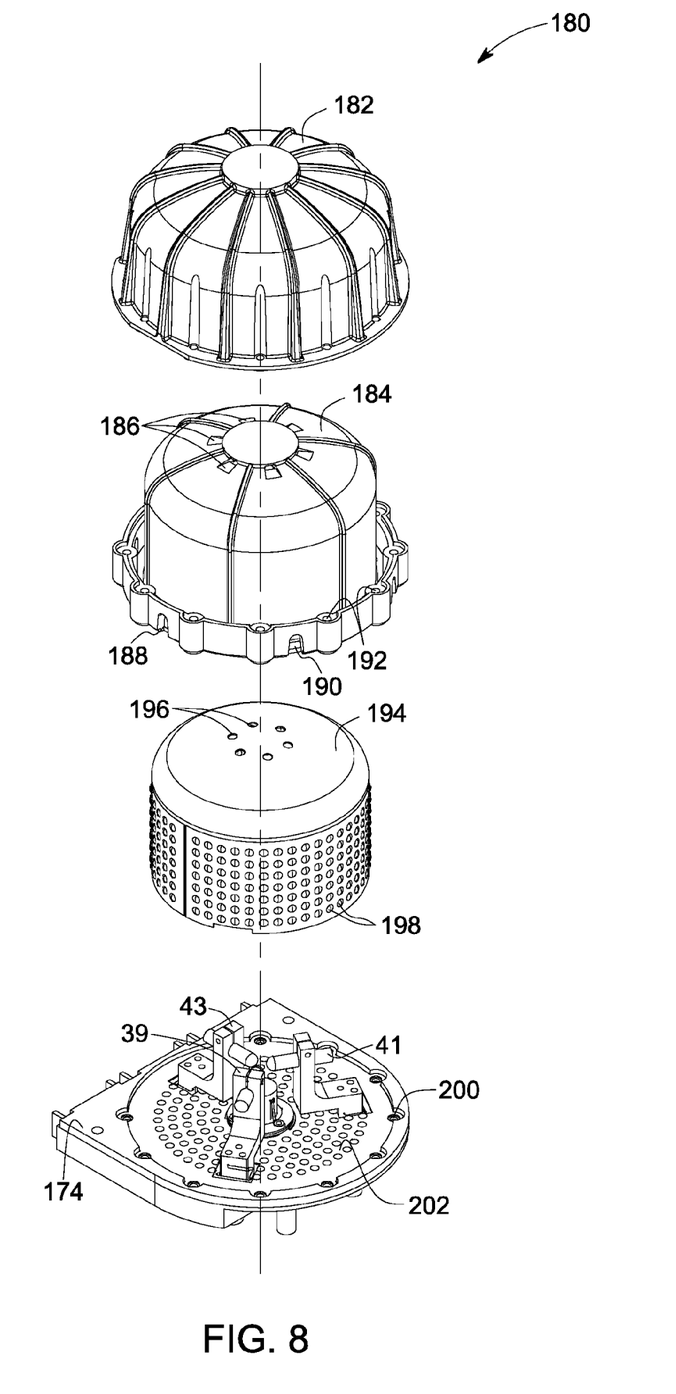
FIG. 8 illustrates an exploded view of the exemplary arc containment device of FIG. 1.

FIG. 8 illustrates an exploded view of the exemplary arc containment device 22 of FIG. 1. The arc mitigating device of FIG. 7 may be enclosed within the arc containment device 180. According to the illustrated embodiment, arc containment device 180 comprises various components such as the outer enclosure 182, an inner enclosure 184, a shock shield 194 and a support assembly 174 as depicted in FIG. 7. In a particular embodiment, the shock shield 194 includes an electrically conducting material or electrically non-conducting material. In one embodiment of the invention, the inner enclosure 184 includes an electrically conducting material or an electrically non-conducting material In a presently contemplated embodiment, the outer enclosure 182 is fastened on to the inner enclosure 184 via bolts (not shown) running through holes such as indicated by reference numeral 192. The bolts are received through generally aligned holes in the outer enclosure 182, the inner enclosure 184 and the support assembly 174. The support assembly 174 includes hole 200 aligned with the holes 192 to accommodate fasteners. The components are thus properly located and solidly held together to resist shock waves and high pressures resulting from arc flash events within the arc containment device 180. The outer enclosure 182 is disposed around the inner enclosure 184. The shock shield 194 is disposed within the inner enclosure 184. In a presently contemplated embodiment, the shock shield 194 comprises corrugations 198 around its periphery. Corrugations 198 help in absorbing the shock waves by way of diffusion and flexing. As will be appreciated by those skilled in the art, by using a shock shield 194, the volumetric construction of the arc containment device 180 may be substantially reduced, as compared to a device without a shock shield to absorb similar magnitudes of shock waves and high pressure. On the top surface of the shock shield 194, apertures 196 are provided that are generally aligned with the openings 186 on the inner enclosure 184 for escape of gas that results from heating by the protective arc 40 as referenced in FIG. 1. Electrodes 39, 41 and 43 are mounted onto the support assembly 174 forming the arc mitigation device. Electrical contact rods (not shown) are provided that extends through the support assembly 174 to facilitate connection of the electrodes 39, 41 and 43 to the electrical circuit. The support assembly 174 may be made of any suitable electrically insulating material and composites to provide an electrical insulation base for the electrodes.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An arc flash elimination system comprising:
    an arc flash mitigating device comprising at least two main electrodes forming a gap in between said main electrodes and each main electrode coupled to a different phase or neutral or ground in an electrical power system circuit, wherein the at least two main electrodes are configured to generate a protective arc therebetween and mitigate an arc flash in the power system circuit when an electrical impedance in the gap between the at least two main electrodes is lowered;
    an ablative plasma gun positioned within the gap, wherein the ablative gun comprises a first gun electrode and a second gun electrode arranged between a dielectric layer to form a longitudinal slot comprising an opening; and
    a trigger circuit configured to generate an electrical pulse between the first gun electrode and the second gun electrode and create a conductive plasma exiting from the opening of the longitudinal slot when the arc flash in the power system circuit is detected;
    wherein the plasma lowers the electrical impedance in the gap between the at least two main electrodes.

2. The arc elimination system of claim 1, wherein the protective arc activates a protection device in the electrical system.

3. The arc elimination system of claim 2, wherein the protection device comprise a circuit breaker or a fuse.

4. An arc flash mitigating device comprising:
    at least two main electrodes separated by a gap and each main electrode coupled to electrically different portions of an electrical power system circuit, wherein the at least two main electrodes are configured to generate a protective arc in between and mitigate an arc flash in the power system circuit when a plasma bridges the gap between the at least two main electrodes;
    at least two ablative plasma guns, each comprising a first gun electrode and a second gun electrode arranged between a dielectric layer, wherein the first gun electrode, the second gun electrode and the dielectric layer are configured to form a longitudinal slot comprising an opening at a distal end;
    wherein said ablative plasma guns are disposed proximate the gap and the main electrodes and configured to bridge the gap between said main electrodes by the plasma created within the longitudinal slot and exiting from the distal end upon receipt of a trigger signal; and
    wherein the trigger signal is generated when the arc flash in the power system circuit is detected.

5. The device of claim 4 further comprises a trigger circuit coupled to the gun-electrodes to generate the trigger signal.

6. The device of claim 4, wherein the plasma comprises plasma from ablation in the ablative plasma gun.

7. The device of claim 4 further comprising a central ablative plasma gun disposed in the gap between at least two ablative plasma guns and configured to enhance the plasma bridging the gap between the at least two main electrodes.

* * * * *